US009628416B2

(12) United States Patent
Henderson

(10) Patent No.: US 9,628,416 B2
(45) Date of Patent: Apr. 18, 2017

(54) PHOTO AVATARS

(71) Applicant: Cisco Technology, Inc., San Jose, CA (US)

(72) Inventor: Andrew Henderson, Co. Galway (IE)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 14/292,029

(22) Filed: May 30, 2014

(65) Prior Publication Data
US 2015/0350125 A1    Dec. 3, 2015

(51) Int. Cl.
| H04L 12/58 | (2006.01) |
| G06F 3/0484 | (2013.01) |
| H04M 1/725 | (2006.01) |
| H04M 3/42 | (2006.01) |
| H04L 12/18 | (2006.01) |
| H04N 21/4788 | (2011.01) |

(52) U.S. Cl.
CPC ........ *H04L 51/043* (2013.01); *G06F 3/04842* (2013.01); *G06F 3/04847* (2013.01); *H04L 51/04* (2013.01); *H04L 51/10* (2013.01); *H04L 12/1813* (2013.01); *H04M 1/72552* (2013.01); *H04M 1/72555* (2013.01); *H04M 3/42382* (2013.01); *H04N 21/4788* (2013.01)

(58) Field of Classification Search
CPC ....... H04L 51/043; H04L 51/08; H04L 51/04; H04L 51/10; H04L 12/581; H04L 12/1813; G06F 3/04842; G06F 3/04847; H04N 21/4788; H04M 1/72552; H04M 1/72555; H04M 3/42382
See application file for complete search history.

(56) References Cited

U.S. PATENT DOCUMENTS

| 6,801,663 | B2 * | 10/2004 | Matsushita | ........ H04N 1/32144 348/14.1 |
| 8,555,179 | B2 * | 10/2013 | Lee | ........ H04N 7/147 348/14.03 |
| 9,094,576 | B1 * | 7/2015 | Karakotsios | ........... H04N 7/157 |
| 9,143,638 | B2 * | 9/2015 | King | ................ G06F 17/30265 |
| 9,288,375 | B2 * | 3/2016 | Walker | ............... H04N 5/23203 |

(Continued)

FOREIGN PATENT DOCUMENTS

| EP | 1509042 | 2/2005 |
| WO | WO2011110727 | 9/2011 |

OTHER PUBLICATIONS

D. Tetteroo, Communicating Emotions in Instant Messaging, an overview, Jun. 23, 2008, 9th Twente Student Conference on IT.

(Continued)

*Primary Examiner* — Shen Shiau
(74) *Attorney, Agent, or Firm* — Lempia Summerfield Katz LLC

(57) ABSTRACT

In one implementation, endpoint computing devices communicate using one or more instant messages. A user interface of an endpoint receives text input from a user for an instant message. The endpoint generates a trigger command in response to the instant message. A camera captures an image in response to the trigger command. The image may depict the user that entered the text input but other images are possible. The endpoint sends the image with the instant message to a recipient of the instant message.

13 Claims, 10 Drawing Sheets

(56) References Cited

U.S. PATENT DOCUMENTS

| | | | |
|---|---|---|---|
| 9,304,621 B1* | 4/2016 | Wakim | G06F 3/0414 |
| 9,338,110 B1* | 5/2016 | Oh | H04L 12/1831 |
| 2002/0072952 A1* | 6/2002 | Hamzy | G06Q 30/02 |
| | | | 705/7.29 |
| 2003/0038884 A1* | 2/2003 | Matsushita | H04N 1/32144 |
| | | | 348/211.5 |
| 2003/0097408 A1* | 5/2003 | Kageyama | H04L 12/1818 |
| | | | 709/205 |
| 2003/0235341 A1* | 12/2003 | Gokturk | G06K 9/00228 |
| | | | 382/243 |
| 2005/0004968 A1* | 1/2005 | Mononen | H04L 63/0823 |
| | | | 709/200 |
| 2006/0029296 A1* | 2/2006 | King | H04N 1/00244 |
| | | | 382/313 |
| 2006/0041627 A1* | 2/2006 | Tu | H04L 51/04 |
| | | | 709/206 |
| 2006/0123086 A1* | 6/2006 | Morris | H04M 1/274575 |
| | | | 709/206 |
| 2006/0143647 A1* | 6/2006 | Bill | G06F 17/30743 |
| | | | 725/10 |
| 2007/0168863 A1 | 7/2007 | Blattner et al. | |
| 2007/0288898 A1* | 12/2007 | Isberg | G06K 9/00335 |
| | | | 717/124 |
| 2008/0126415 A1* | 5/2008 | Chaudhury | G06K 9/6857 |
| 2008/0298571 A1* | 12/2008 | Kurtz | H04N 7/142 |
| | | | 379/156 |
| 2011/0283190 A1* | 11/2011 | Poltorak | G10L 13/033 |
| | | | 715/716 |
| 2011/0314084 A1* | 12/2011 | Saretto | G06F 17/30867 |
| | | | 709/203 |
| 2012/0327091 A1 | 12/2012 | Eronen et al. | |
| 2013/0065569 A1* | 3/2013 | Leipzig | H04W 8/22 |
| | | | 455/416 |
| 2016/0127287 A1* | 5/2016 | Oh | H04L 12/1831 |
| | | | 715/752 |

OTHER PUBLICATIONS

Rincon-Nigro et al., A Text Driven Conversational Avatar Interface for Instant Messaging on Mobile Devices, May 2013, IEEE Transactions on Human-Machine Systems.

* cited by examiner

US 9,628,416 B2

PHOTO AVATARS

TECHNICAL FIELD

This disclosure relates in general to the field of instant messaging, and more particularly, to photographic avatar images for instant messaging.

BACKGROUND

An avatar may be a graphical representation of an alter ego of a user. Often, users of video games or user-based websites select an avatar from a set of pre-stored avatar images. In other examples, users may design an avatar by selecting personal characteristics such as hair color, skin color, face shape, nose type, body type, clothing and other features.

The avatar for a particular user is typically constant. Regardless of who is actually logged into the user's account, or the actual appearance of the user, the same image is repeatedly displayed as the user's avatar. Avatars do not change expression and may not accurately portray the actual appearance of the user.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one implementation, endpoint computing devices communicate using one or more instant messages. A user interface of an endpoint receives text input from a user for an instant message. The endpoint generates a trigger command in response to the instant message. A camera captures an image in response to the trigger command. The image may depict the user that entered the text input but other images are possible. The endpoint sends the image with the instant message to a recipient of the instant message.

Example Embodiments

An instant messaging service allows messages to be exchanged between users. Each user may maintain a contact list of friends, co-workers, or any type of other users. A user may initiate an instant messaging conversation by selecting another user from the contact list and typing a message for the other user. The instant messaging conversation may be more interactive or more conversational than email or other formal electronic communications. The individual messages are typically shorter than email or other electronic communications. An instant message may be limited by a maximum number of characters.

The instant messaging service may operate through a website or through a standalone software application such as a mobile application. The application or the website may include a username and password associated with the photo avatars. The application or website may store or log a record of the instant messages along with timestamps, sender usernames, recipient usernames, or other data. Any instant messaging and corresponding processes may be used.

Rather than represent users of the instant messaging service with static avatars, the following embodiments capture photographs of the users during the instant message conversation. The photographs are used as avatars, which may be referred to as photo avatars. The photo avatars may be collected automatically based on the entry of instant messages, based on a command from the user, or based on other trigger events associated with the instant messaging. The photographs may be stored in the log of instant messages stored by the application or website or may not be stored.

Figure 1:
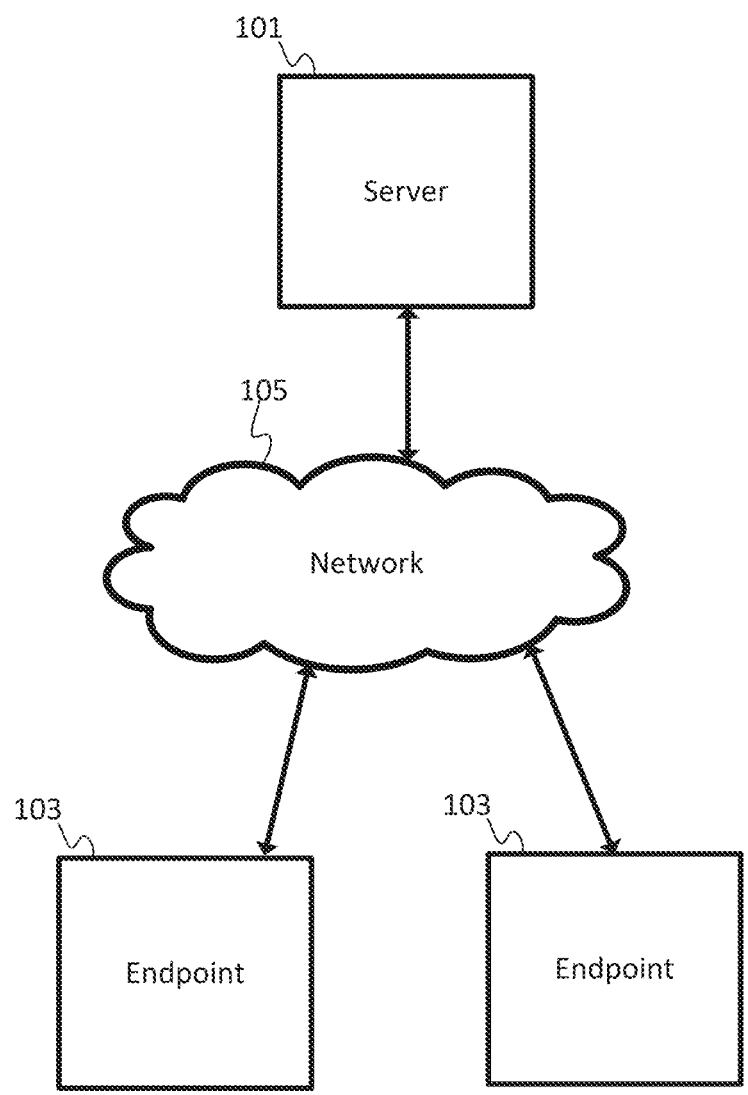
FIG. 1 illustrates an example system for photo avatars.

FIG. 1 illustrates an example system for photo avatars. The system includes a server 101, a network 105, and multiple endpoints 103. Additional, different, or fewer devices may be included in the system. The endpoints 103 may include any type of computing device. Examples include laptop computers, desktop computers, mobile phones, smartphones, personal digital assistants, tablet computers, video game consoles, or other computing devices. Different types of endpoints 103 may interact in the system for photo avatars.

A user may initiate an instant message conversation via a user interface of one of the endpoints 103. The user may enter text to send to another user at one of the other endpoints 103. The endpoint 103 receives the text input for the instant message and triggers an image capture based on the instant message or event associated with the creating or sending of the instant message.

The endpoint 103 may generate a trigger command based on the instant message. The trigger command causes a camera to capture the image. In one example, the image is a picture of the user. For example, the user types a message, presses send, and the endpoint 103 automatically captures an image of the user in response to the send command. Because there is no guarantee that the user is within the viewing frustum of the camera, the user may not appear in the image. In some examples, this may be intentional. The user may point the camera at another object in the user's vicinity. For example, the user may type the message "Hello from Paris," press send, and point the camera at the Eiffel Tower. The endpoint 103 sends the instant message along with the image of the Eiffel Tower.

The trigger command may be generated automatically based on entry of the instant message. For example, the trigger command may be generated when the user presses send for an instant message. In another example, the trigger command may be generated when the user begins to enter the text for the instant message. The trigger command may be generated based on a specific number of characters entered for the instant message. Alternatively, the trigger command may be generated based on the content of the text for the instant message. The endpoint 103 may analyze the text to identify when a punctuation mark has been entered by the user. The punctuation mark signifies an end of one thought or statement and the beginning of the next thought or statement.

The endpoint 103 may analyze the text and identify a trigger word. Trigger words may describe emotional states of the instant message. Example trigger words include angry, happy, sad, upset, crazy, need, urgent, excited, love, impressed, disappointed, proud, hate, like, please, help, furious, or other words. The trigger words may be classified into levels of intensity. The endpoint 103 may trigger an image capture after a high number (e.g., 3 or more) of low intensity words have been entered into one or more instant messages. Example low intensity words include like, please, happy, or other examples of words that relay moderate emotions or opinions.

The endpoint 103 may trigger an image capture after a low number (e.g., 1 or 2) of high intensity words have been entered into one or more instant messages. Example high intensity words include love, hate, furious, angry, or other examples of words that relay intense emotions or opinions.

A camera for the image capture may be integrated with the endpoint 103 or a peripheral associated with the endpoint 103. The integrated camera may be a front facing camera or a rear facing camera. The peripheral camera may be physically connected to the endpoint 103 such as a universal serial bus (USB) camera. The peripheral may be wirelessly connected to the endpoint 103 using a wireless protocol such as any one of the family of protocols known as IEEE 802.11, any one of the family of protocols known as Bluetooth, or another type of communication.

The endpoint 103 sends the image of the user or other captured image with the instant message to a recipient of the instant message via the network 105. The instant message includes a username corresponding to the recipient. The server 101 may receive the instant message, consult a user database for the recipient username, and forward the instant message to an IP address that corresponds to the recipient username.

Figure 2:
FIG. 2 illustrates an example instant messaging conversation using photo avatars.

FIG. 2 illustrates an example endpoint 103 including a user interface. The endpoint 103 may include a front facing camera 110, a conversation selector display 109, and a status bar display 108. In the case of mobile devices, the status bar display 108 may include a signal strength icon, a time, and/or a battery strength icon. The conversation selector display 109 may include the name of the current recipient of the instant messages and allows the user to switch between multiple conversations. The conversation selector display 109 may also allow the user to merge instant message conversations. In a merged instant message conversation, the endpoint 103 communicates with multiple other endpoints.

The user interface is configured to receive user inputs and display an instant messaging conversation using photo avatars. The user interface may include any combination of a send input 118, a capture input 116, and a text input 119. The text input 119 receives alphanumeric characters from the user to form an instant message. In other examples, the user may speak into a microphone, and the endpoint 103 executes a voice recognition algorithm to form the text of the instant message. The send input 118 instructs the endpoint 103 to send the instant message. In some examples, the send input 118 also instructs the camera 110 to capture an image.

The capture input 116, which is optional, receives an input from the user to capture the image. The capture input 116 may be a portion of a touchscreen of the user interface. Alternatively, the capture input 116 may include a physical button on the endpoint 103 or a shortcut key on a keyboard. The capture input 116 allows the user to select when to take the picture, giving the user opportunity to aim the camera 110. Other interfaces with additional, different, or fewer options, inputs, or display features may be used.

In one alternative, the user enters an instant message in the text input 119 and presses the send input 118. The send input 118 prompts the endpoint to display the capture input 116 or illuminate the capture input 116, which indicates the option, or requirement, to capture a photo avatar at that time. The user subsequently presses the capture input 116 when ready, and the camera 110 snaps a picture. The image and the recently entered instant message may be sent in succession or the endpoint 103 may package the instant message and the image together for simultaneous transmission.

In one example, the endpoint 103 does not send an instant message until the user presses the capture input 116 and captures an image. The endpoint 103 may analyze the content of the image to determine if the image includes a human face. If no face is included, the endpoint 103 prompts the user to capture another image. If a face is included, the endpoint 103 forwards the instant message and the image as requested.

FIG. 2 illustrates an instant message conversation between two users. However, any number of users may interact in the instant message conversation. The initial photo avatar 113 may be a default picture of the user. The default picture may be selected by the sending or receiving user for that contact. Alternatively, the initial photo avatar 113 is captured in response to any of the triggers. A later message is coupled to a photo avatar 115 with a concerned look. The concerned photo avatar image 115 may be captured as the real time facial expression of the user. The concerned photo avatar image 115 may be captured in response to the trigger word "crazy" in the instant message text. A later message is coupled to an excited photo avatar image 117. The excited photo avatar image 117 may be captured in real time to reflect the facial expression of the user. The excited photo avatar image 117 may be captured in response to the trigger word "need" in the instant message text. While shown in FIG. 2 as graphical representations of faces, the photo avatar images 111-117 are actual photographs of the appropriate users.

In one example, the endpoint 103 stores a photo avatar for the user, and then replaces the photo avatar when another image is captured. Therefore, any one photo avatar may be used for a series of instant messages. In another example, the endpoint sends the current photo avatar for a predetermined number (e.g., 1, 2, 4, 8, 20, or another value) of instant messages. A new photo may be captured for each message. Any combination of photo and non-photo (graphics or smiles) images may be used.

Figure 3:
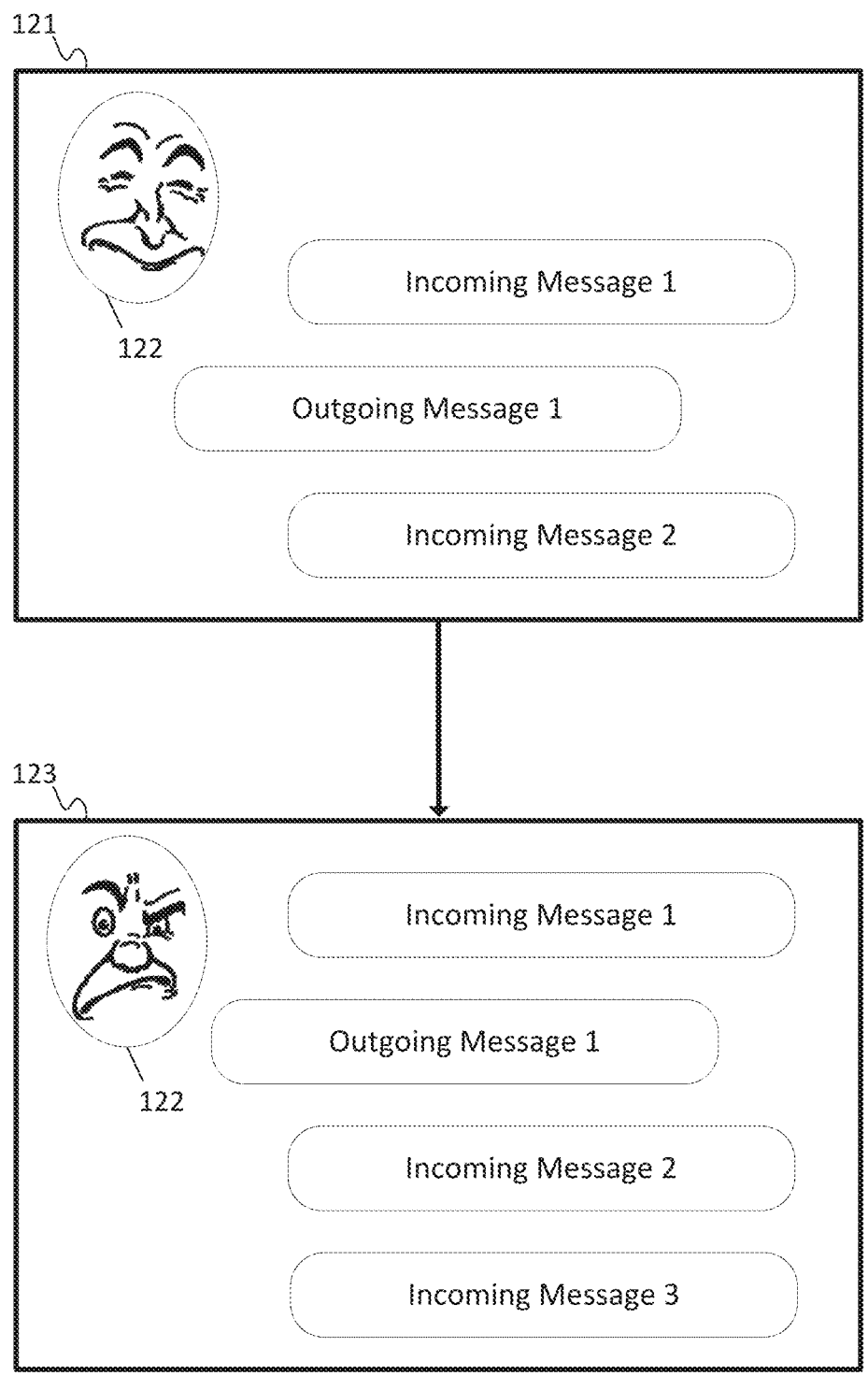
FIG. 3 illustrates an example instant messaging conversation using photo avatars.

FIG. 3 illustrates an example instant messaging conversation using photo avatars. A first frame 121, corresponding to an initial state of the user interface, includes the instant messaging conversation including three messages (incoming message 1, outgoing message 1, incoming message 2). The first frame 121 includes photo avatar 122 in an initial facial expression or a default facial expression. In the second frame 123, the user has sent an additional message (incoming message 3), which has triggered the camera 110 to capture an image, causing the photo avatar 122 to change expression to another facial expression or subsequent facial expression.

In one alternative, the photo avatar may be an image of the recipient of the instant message. That is, the photo avatar 122 may be sent in response to receipt of an instant message to represent the reaction of the recipient to the instant message. The trigger command for capturing the instant message may be generated in response to receiving, opening, or reading an instant message from another endpoint. The trigger command may cause an image to be captured by the camera 110 immediately after the instant message is received or displayed on the screen. The trigger command may cause an image to be captured by the camera 110 after a predetermined time delay or upon occurrence of an event. Example predetermined time delays include 10 milliseconds, 100 milliseconds, 1 second, or other quantities of time. Combinations of recipient and sender photo avatars may be used in a conversation. The photo avatars of the sender may be sent to the receipt and may or may not be also displayed to the sender. Similarly, photo avatars of the recipient may be sent to the sender and may or may not be displayed to the recipient.

Figure 4:
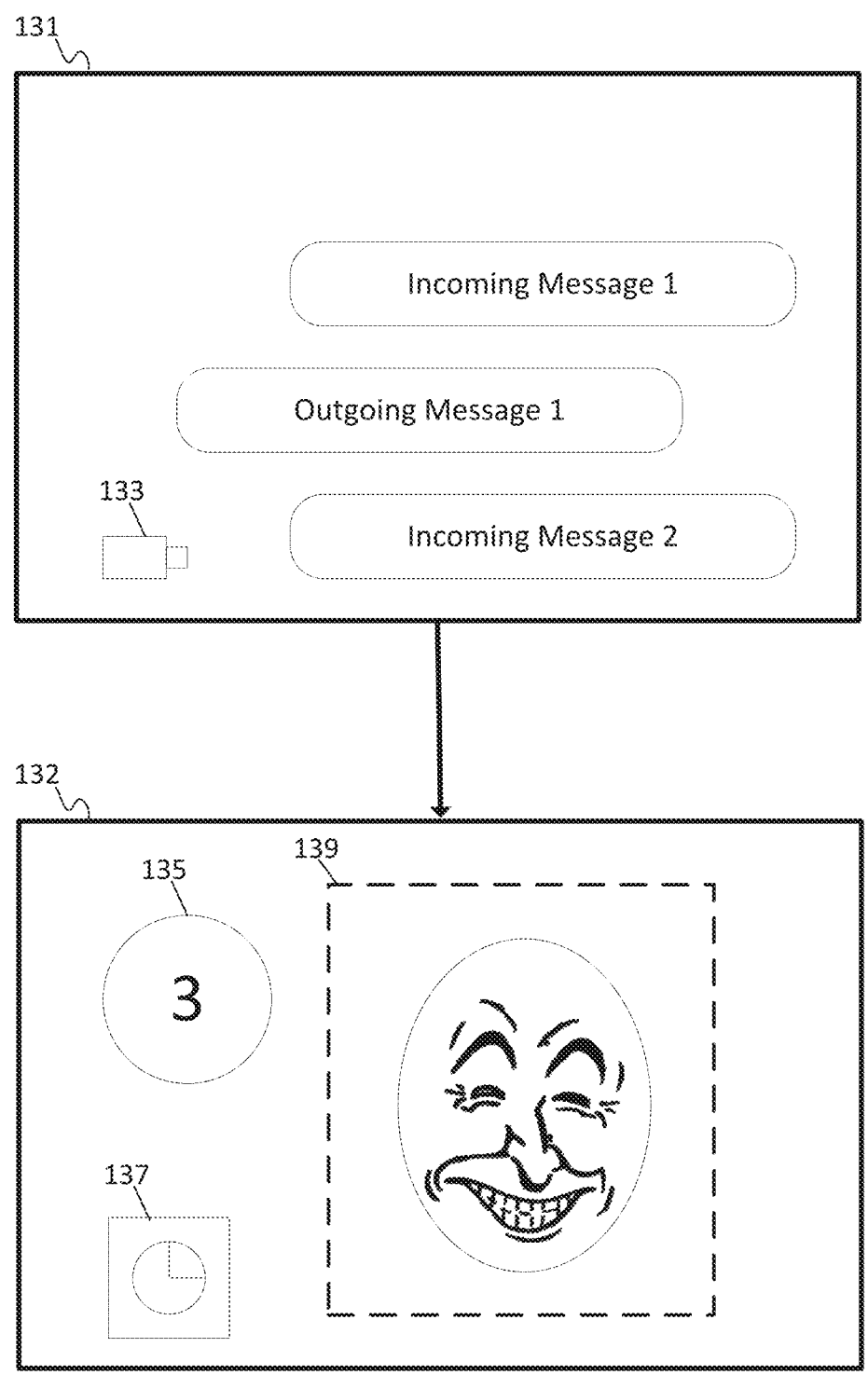
FIG. 4 illustrates an example camera interface for photo avatars.

FIG. 4 illustrates an example camera interface for capturing photo avatars at an endpoint 103. An initial state 131 may include an instant message conversation. When the endpoint 103 generates a trigger command based on the entry of one of the instant messages, a send input, or a camera input (e.g., by pressing camera button 133), the input may transition to camera interface 132. The camera interface 132 may include any combination of a numeric timer 135, a graphical timer 137, and a frame 139. The endpoint 103 may alert the user of the amount of time remaining through a countdown at the numeric timer 135 (e.g., 3-2-1-capture) or a countdown at the graphical timer 137 that simulates the hands of clock moving. Alternatively, no count down is given and/or no delay before capture is provided.

The frame 139 allows the user to aim the camera at the desired angle and designed size for capturing the photo avatar. As the user moves the camera (e.g., front facing camera 110 or tethered camera) the image of the user or other object moves with respect to the frame 139. In one example, the endpoint 103 may automatically detect (e.g., through facial recognition, eye gaze detection, or another technique) when the face of the user is adequately centered in the frame 139. In another example, the endpoint 103 may include one or more sensors for determining the orientation of the camera 110 that is likely to be aimed at the user. The sensors may include any combination of tilt sensors, accelerometers, magnetic sensors, gyroscopes or other sensors. The detection or sensing may cause photo capture rather than waiting for a count down.

In addition or in the alternative, the camera 110 may capture the default photo avatar before the instant message conversation has begun. For example, when an instant message application is selected by the user, the endpoint 103 may enter the camera interface 132 and prompt the user the capture an image. In another example, a facial recognition locking feature on the endpoint 103 may use facial recognition as a security feature to unlock the endpoint 103. The endpoint 103 may prompt the user to point camera 110 at the user's face before the endpoint 103 gives access to the functions and features of the device. The endpoint 103 may use this security feature to capture a new photo avatar each time the user unlocks the endpoint 103. As another example, the capture occurs before typing a message but in response to an indication of creation of a specific message conversation (e.g., selecting a contact and indication creation of a message).

In another alternative, the endpoint 103 may instruct the camera 110 to capture a series of images in response to the trigger command. The series of images may be spaced by a predetermined interval (e.g., 100 milliseconds, 1 second, 3 seconds, or another value). The endpoint 103 may present the series of images to the user so that the user selects the image that is transmitted along with the instant message.

Figure 5:
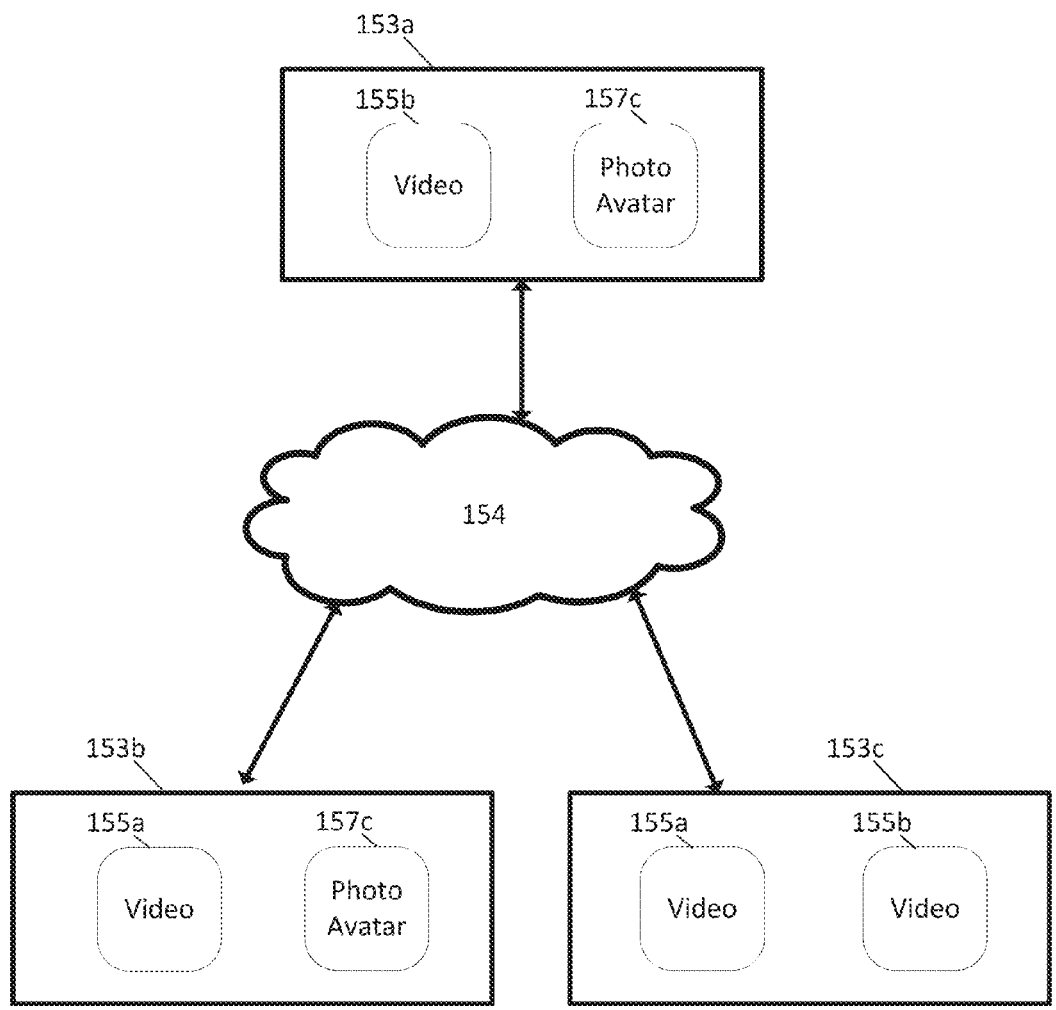
FIG. 5 illustrates an example videoconference including photo avatars.

FIG. 5 illustrates an example videoconference including instant messaging and photo avatars. The video conference includes multiple endpoints 153a-c. The endpoints 153a-c may include any combination of personal computers, mobile phones, tablet computers, or other computing devices. The endpoints 153a-c communicate via network 154, which may include server 101. The endpoints 153a-c are configured for users to enter instant messages into the video conference. Some users may enter instant messages, while sending streaming video to the videoconference. Other users may send instant messages without sending streaming video to the videoconference. For those users, photo avatars may be sent to the video conference. Thus, the videoconference may combine streaming video with still photo avatars associated with instant messages. A given user may use both streaming video and still photos, such as capturing a still photo of the user as the user is displayed as part of the streaming video.

In one example, endpoints 153a and 153b are configured to send streaming video. The endpoints may be able to stream video because of any combination of reasons including sufficient computing resources to generate the video, sufficient bandwidth with the network 154 to transmit the video, and a user setting to enable sending video. Endpoint 153c may not be configured to send streaming video. Endpoint 153c may not be configured to send streaming video because a user has deselected or disabled streaming video. Endpoint 153c may not be configured to send streaming video because the endpoint 153c is running too many other applications to generate and transmit streaming video.

Endpoint 153c may not be configured to send streaming video because there is insufficient bandwidth to transmit streaming video. In one example, the endpoint 153c may detect the bandwidth with network 154 and compare the detected bandwidth with a bandwidth threshold. In another example, the endpoint 153c may detect a connection type. Example connection types include cellular, 802.11 wireless, wired Ethernet, Bluetooth and other technologies.

The endpoint 153c may include a lookup table that designates some connection types as sufficient for sending streaming video and other connection types as insufficient for sending streaming video. In one example, data network connections (e.g., 802.11 connections or wired connections) are designated as sufficient for sending streaming video and cellular network connections are designated as insufficient for sending streaming video. In another example, different types of cellular connections are distinguished (e.g., 3G or faster connections are required for sending video).

Rather than send video, endpoint 153c may send a photo avatar captured using any of the examples above to the videoconference. Thus, as shown in FIG. 5, endpoint 153a is configured to display video 155b from endpoint 153b and photo avatar 157c from endpoint 153c, and endpoint 153b is configured to display video 155a from endpoint 153a and photo avatar 157c from endpoint 153c.

Figure 6:
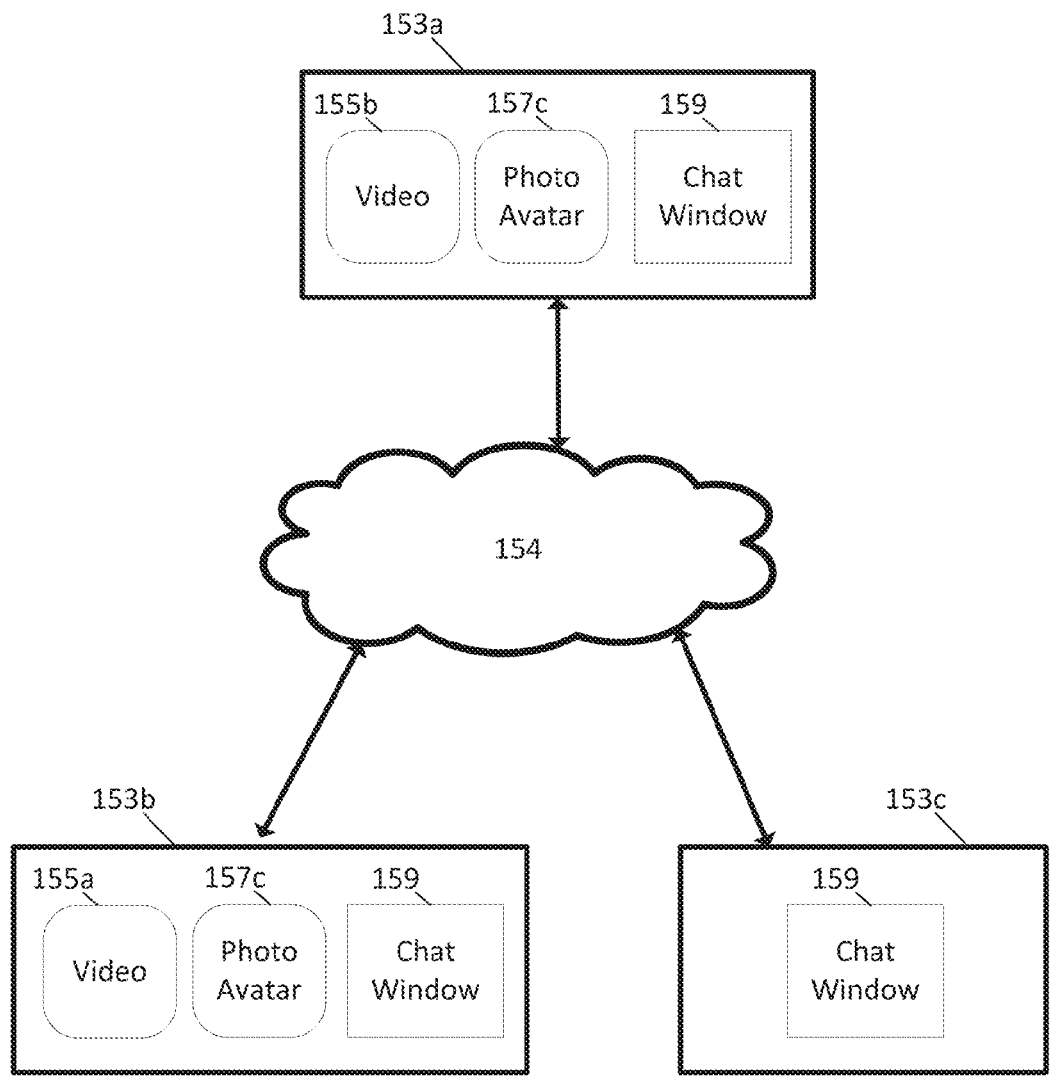
FIG. 6 illustrates another example videoconference including photo avatars.

The endpoint 153c may receive and display the video streams 155a and 155b. However, because of the same or similar bandwidth concerns, endpoint 153c may block video streams 155a and 155b. As shown in FIG. 6, the endpoint 153c may display a chat window 159 for inputting instant message and receiving instant messages from endpoints 153a and 153b. Endpoints 153a and 153b may also generate and display a similar chat window 159 for inputting instant message and receiving instant messages from the other endpoints.

Figure 7:
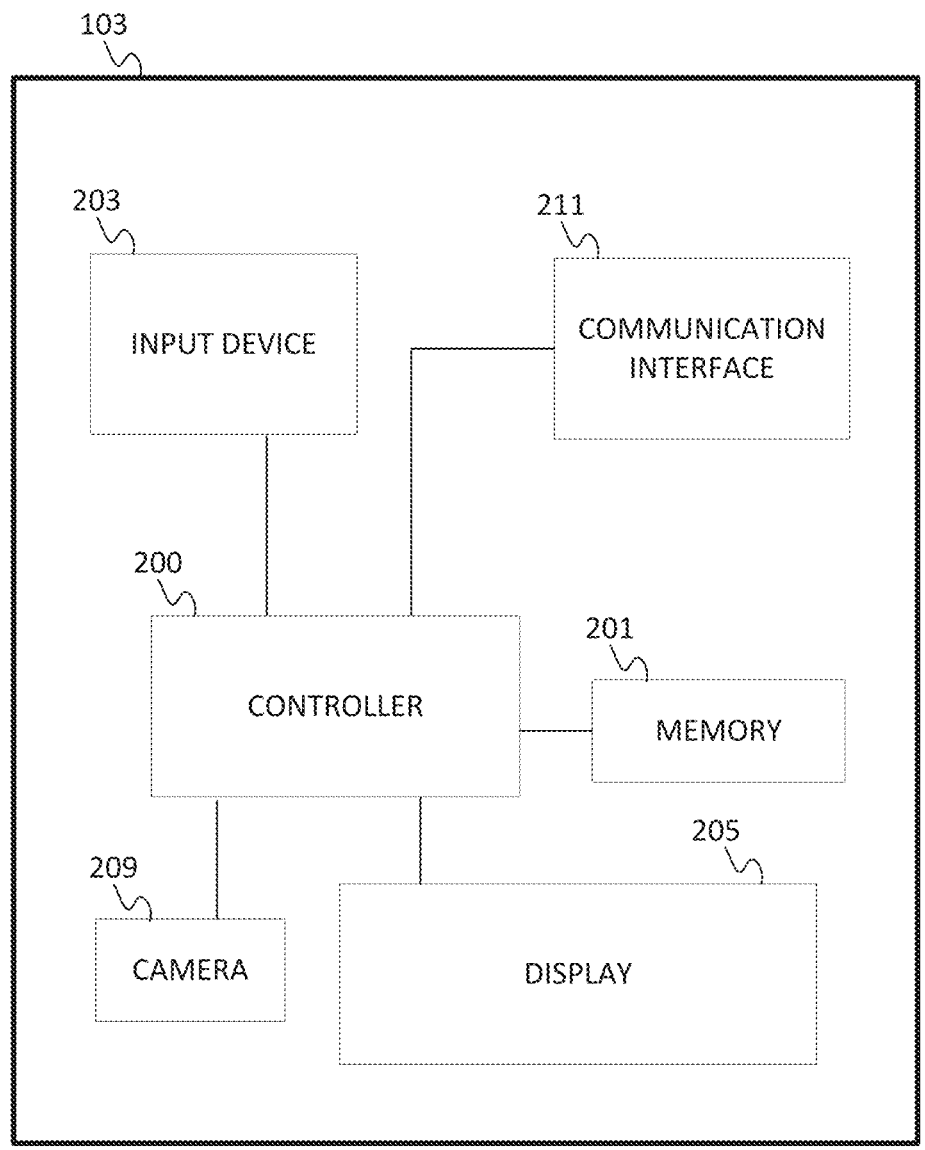
FIG. 7 illustrates an example endpoint device for the system of FIG. 1.

FIG. 7 illustrates an example endpoint 103 for the system of FIG. 1. The endpoint 103 may include a controller 200, a memory 201, an input device 203, a camera 209, a communication interface 211 and a display 205. Additional, different, or fewer components may be provided. Different network devices may have the same or different arrangement of components.

Figure 8:
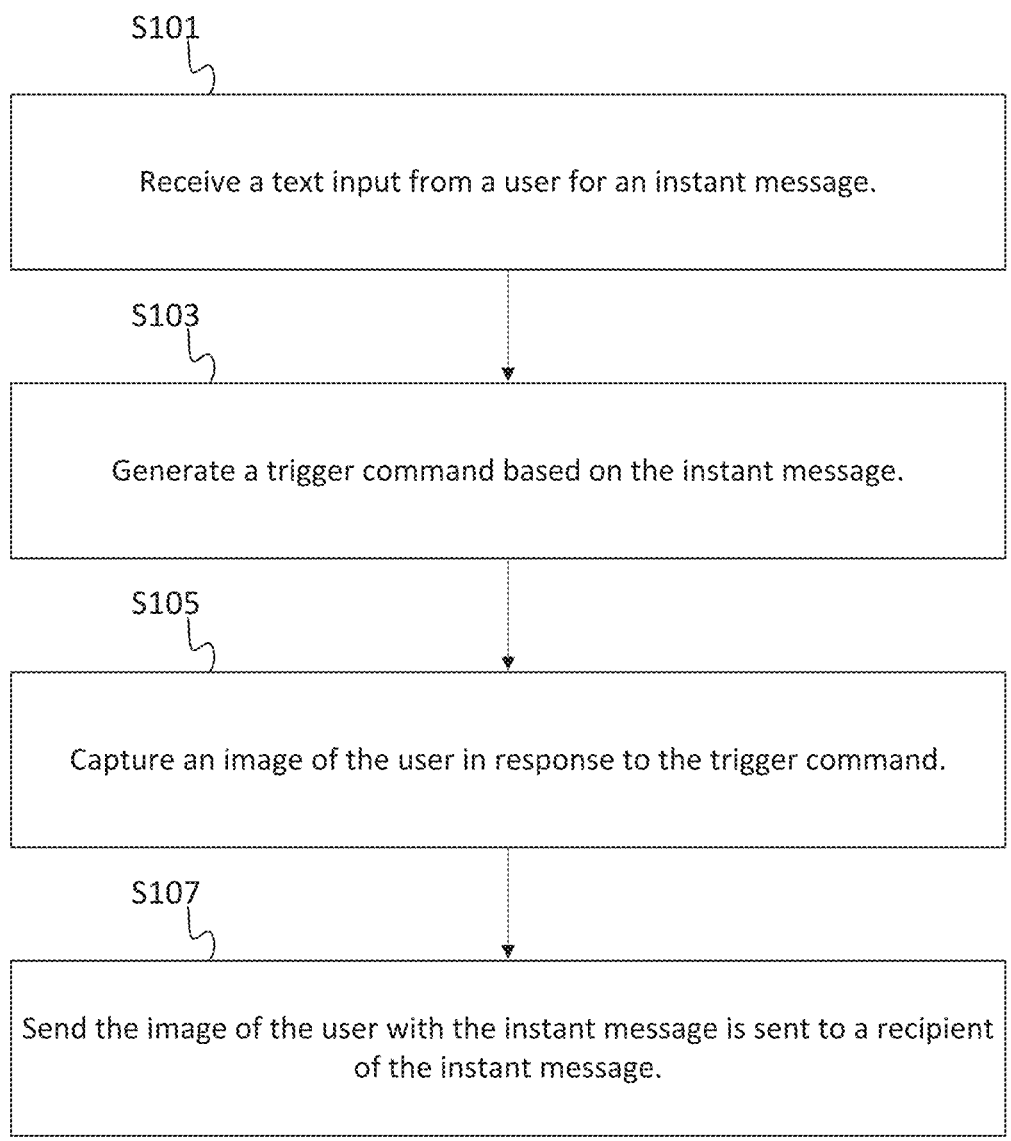
FIG. 8 illustrates an example flowchart for the endpoint device of FIG. 7.

FIG. 8 illustrates an example flowchart for the example endpoint of FIG. 7. Additional, different, or fewer acts may be provided. The acts are performed in the order shown or other orders. The acts may also be repeated.

At act S101, the communication interface 211 or controller 200 receives a text input from a user for an instant message. The text input may be words typed on the screen of display 205 or through input device 203. Alternatively, words may be spoken and received at a microphone as the input device 203, and the controller 200 may convert the spoken words to text through voice recognition.

At act S103, the controller 200 generates a trigger command based on the instant message. The trigger command may be generated in response to entry of text in an input window for an instant message. The trigger command may be generated in response to the user sending the instant message or other trigger command associated with instant messaging.

At act S105, the camera 209 captures one or more images in response to the trigger command. The controller 200 may prompt or warn the user that the camera 209 will soon take a picture. The controller 200 may prompt the user to select a time for the picture to be taken. The controller 200 may cause capture of the image only after authorization or picture triggering by the user.

At act S107, the communication interface 211 sends the image captured by the camera 209 in associated with the instant message to a recipient of the instant message (e.g., another endpoint 103). The image and the instant message may be combined in a single packet or file. The recipient may display the instant message and the image. The display may include a word bubble such that the instant message appears as speech of the user in the captured image. Alternatively, the image is displayed separately, such as in a corner of the screen, from the message.

The controller 200 may store the text entered in the input window and index the captured image by the text. For example, if the instant message is "help," the controller may store the resulting captured image with the index word help. Subsequently, if the user sends another instant message using the word "help," the controller may query a database for the word and access the previously captured image. The previously captured image is re-used using the new instant message. Any labeling or linking may be used.

The input device 203 may be one or more buttons, keypad, keyboard, mouse, stylist pen, trackball, rocker switch, touch pad, voice recognition circuit, or other device or component for inputting data to the endpoint 103. The input device 203 and the display 205 may be combined as a touch screen, which may be capacitive or resistive. The display 205 may be a liquid crystal display (LCD) panel, light emitting diode (LED) screen, thin film transistor screen, or another type of display. The display 205 is configured to display the first and second portions of the content.

Figure 9:
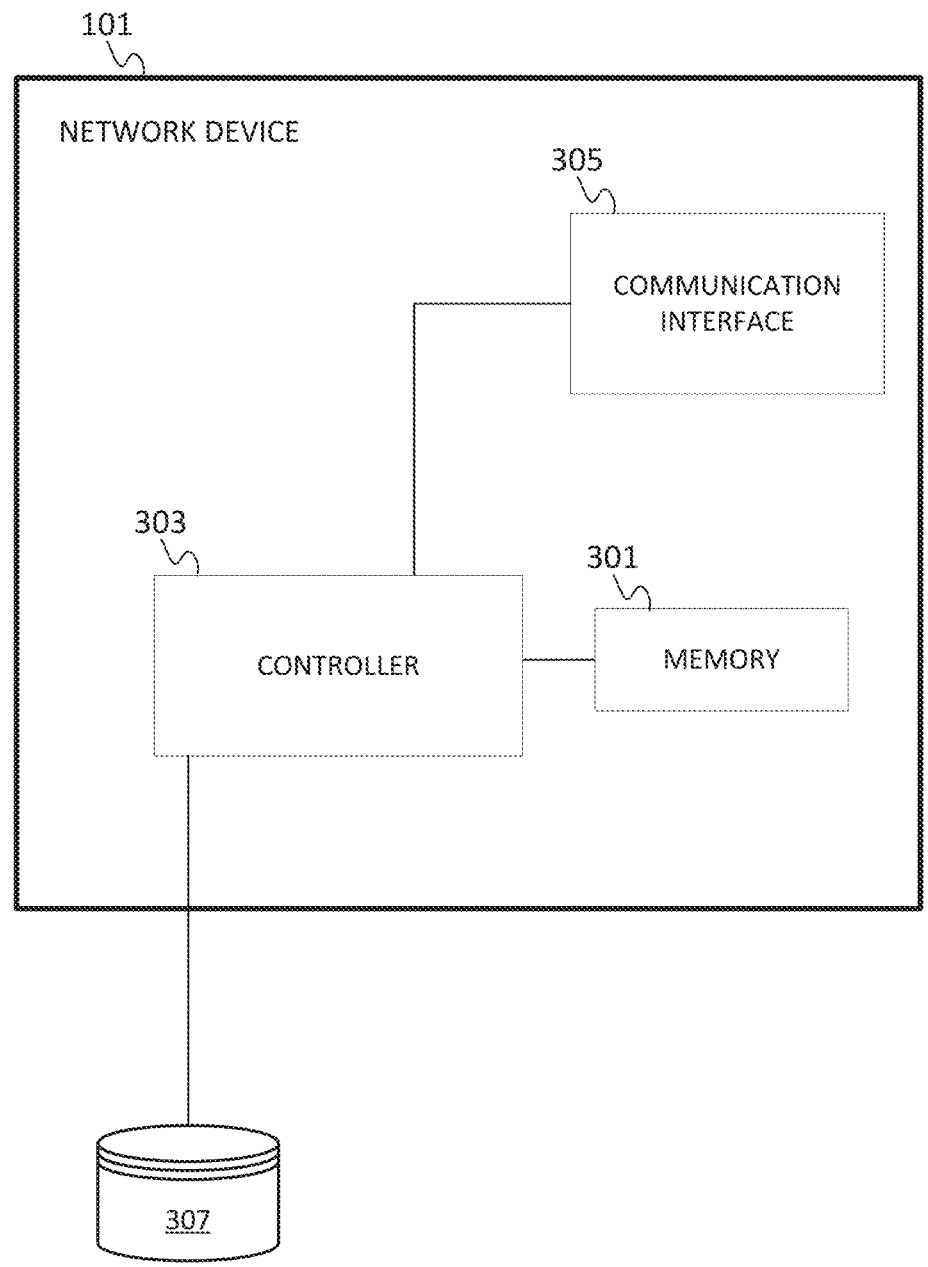
FIG. 9 illustrates an example server for the system of FIG. 1.

FIG. 9 illustrates an example server 101 for the system of FIG. 1. The server 101 includes at least a memory 301, a controller 303, and a communication interface 305. In one example, a database 307 stores any combination of user settings, photo avatars, a log of received photo avatars, and a dictionary of trigger words. Additional, different, or fewer components may be provided. Different network devices may have the same or different arrangement of components.

Figure 10:
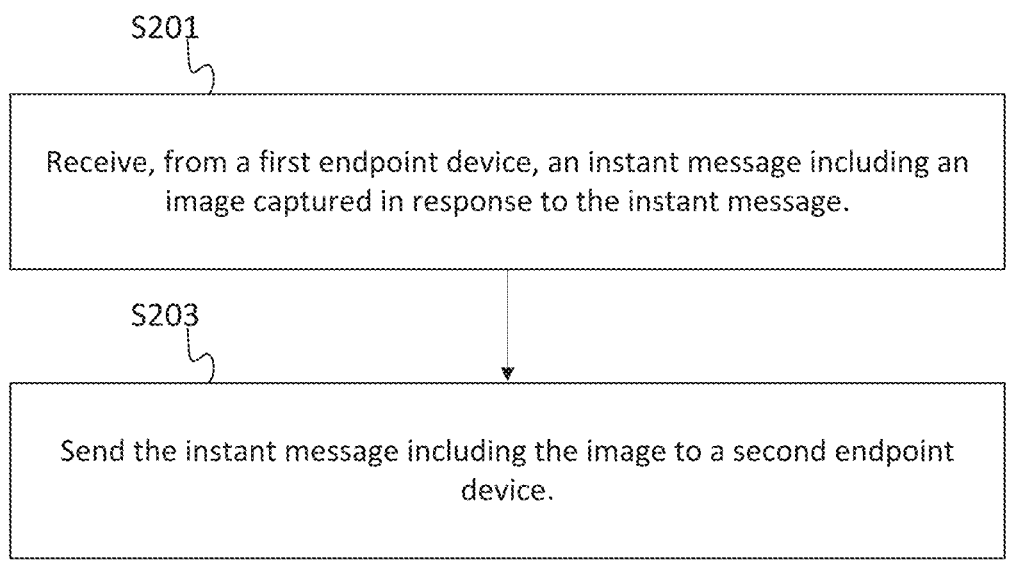
FIG. 10 illustrates an example flowchart for the server of FIG. 9.

FIG. 10 illustrates an example flowchart for the server 101. Additional, different, or fewer acts may be provided. The acts are performed in the order shown or other orders. The acts may also be repeated.

At act S201, communication interface 305 or the controller 303 receives one or more instant messages tied to a captured image from one endpoint. The captured image is captured by the endpoint based on the entry of the instant message.

At act S203, the communication interface 305 or the controller 303 sends the instant message including the image to the recipient endpoint. The controller 303 may extract a recipient identity from the one or more instant messages. The recipient identity may be a username, a code, or an address. The controller 303 accesses database 307 for the recipient identity. The database 307 may associate recipient identity with an IP address of the recipient endpoint. The database 307 may associate a next hop address with the address received with the instant message.

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the endpoint device 101, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving, by a user interface of an endpoint, text input from a user for an instant message;
   performing, by a processor of the endpoint, an analysis of the instant message;
   generating, by a processor of the endpoint, a trigger command based on the analysis;
   capturing, by a camera of the endpoint, an image of the user in response to the trigger command based on the analysis; and
   sending the image of the user with the instant message to a recipient of the instant message.

2. The method of claim 1, wherein the trigger command is generated in response to punctuation in the text input for the instant message.

3. The method of claim 1, wherein the trigger command is generated in response to the text input for the instant message including a trigger word.

4. The method of claim 1, further comprising:
   sending the image of the user with a subsequent instant message.

5. The method of claim 1, wherein the instant message is a first instant message, the method further comprising:
   receiving a second instant message from the recipient of the first instant message, wherein the second instant message includes an image of the recipient triggered by the second instant message.

6. The method of claim 1, the method further comprising:
   displaying, at the endpoint, the image of the user with the instant message and a subsequent image of the user with a subsequent instant message.

7. An apparatus comprising:
   a user interface configured to receive a text input from a user for an instant message;
   a processor configured to analyze the instant message and generate a trigger command in response to use of the instant message and the analysis; and
   a camera configured to capture an image of the user based, at least in part, on the trigger command, wherein the image of the user with the instant message is sent to a recipient of the instant message.

8. The apparatus of claim 7, wherein the trigger command is generated in response to the text input for the instant message including a trigger word.

9. The apparatus of claim 7, wherein the processor is configured to enter a camera mode in response to the trigger command, and the camera is configured to capture the image of the user in response to a user entry in the camera mode.

10. The apparatus of claim 7, further comprising:
    a communication interface configured to receive streaming video and photo avatars in a video conference.

11. A method comprising:
    receiving an instant message from a first endpoint device, wherein the instant message includes text input from a first user, an image from the first user, and an identity of a second user, and wherein the image is captured automatically in response to the text input and an analysis of the text input; and
    sending the instant message including the text input from the first user and the image from the first user to a second endpoint device associated with the identity of the second user.

12. The method of claim 11, further comprising:
    forwarding a video stream from the second user to the first user.

13. The apparatus of claim 12, wherein the image is captured based a trigger command from the first endpoint device.

* * * * *